(12) United States Patent
Daoud et al.

(10) Patent No.: US 10,841,741 B2
(45) Date of Patent: *Nov. 17, 2020

(54) SYSTEMS AND METHODS FOR PROVIDING ERROR CORRECTION AND MANAGEMENT IN A MOBILE-BASED CROWDSOURCING PLATFORM

(71) Applicant: CROWDCOMFORT, INC., Wenham, MA (US)

(72) Inventors: Abdullah Daoud, Lynnfield, MA (US); Chris Fuentes, Plaistow, NH (US); B. Eric Graham, Wenham, MA (US)

(73) Assignee: CrowdComfort, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,978

(22) Filed: Jul. 7, 2016

(65) Prior Publication Data

US 2017/0010936 A1 Jan. 12, 2017

Related U.S. Application Data

(60) Provisional application No. 62/189,446, filed on Jul. 7, 2015, provisional application No. 62/189,448, filed
(Continued)

(51) Int. Cl.
| | |
|---|---|
| *H04W 24/00* | (2009.01) |
| *H04W 4/029* | (2018.01) |
| *H04W 40/24* | (2009.01) |
| *H04W 40/20* | (2009.01) |
| *H04M 1/725* | (2006.01) |

(Continued)

(52) U.S. Cl.
CPC ....... *H04W 4/029* (2018.02); *H04M 1/72572* (2013.01); *H04W 4/33* (2018.02); *H04W 4/90* (2018.02); *H04W 40/20* (2013.01); *H04W 40/244* (2013.01); *H04M 2250/10* (2013.01); *H04M 2250/12* (2013.01)

(58) Field of Classification Search
CPC .............................. H04W 4/04; H04W 4/043
USPC ............ 701/408; 342/452; 455/456.3; 714/1
See application file for complete search history.

(56) References Cited

U.S. PATENT DOCUMENTS 8,630,714 B1   1/2014 Webb
9,224,206 B1 * 12/2015 Lookingbill ............ G06T 19/00
(Continued)

*Primary Examiner* — Chae M Ko
(74) *Attorney, Agent, or Firm* — Nutter McClennen & Fish LLP

(57) ABSTRACT

The present invention provides systems and methods for providing error correction and management in a mobile-based crowdsourcing platform, specifically a platform providing geolocation services. More specifically, the system of the present invention includes a plurality of remote mobile devices configured to communicate and exchange data with a cloud-based service, such as a crowdsourcing platform. The crowdsourcing platform generally provides a geolocation service based on the crowdsourcing, or polling, of users of the mobile devices so as to determine location and movement of the users within a specific environment. The system is further configured to automatically render a floor plan or layout of a location based on the user data. The system is further configured to recognize and recalibrate data errors during the collection and aggregation of the crowd-sourced data.

14 Claims, 7 Drawing Sheets

Related U.S. Application Data on Jul. 7, 2015, provisional application No. 62/189,451, filed on Jul. 7, 2015.

(51) Int. Cl.
*H04W 4/90* (2018.01)
*H04W 4/33* (2018.01)

(56) References Cited

U.S. PATENT DOCUMENTS

| | | |
|---|---|---|
| 9,407,728 B2 | 8/2016 | Marshall et al. |
| 9,733,091 B2 * | 8/2017 | Kordari ............... G01C 21/206 |
| 9,846,222 B2 * | 12/2017 | Ryan .................... G01S 5/16 |
| 2010/0286937 A1 | 11/2010 | Hedley et al. |
| 2012/0046860 A1 * | 2/2012 | Curtis ................ G06Q 30/0282 |
| | | 701/418 |
| 2013/0059598 A1 | 3/2013 | Miyagi et al. |
| 2013/0144546 A1 | 6/2013 | Brackney et al. |
| 2013/0290707 A1 * | 10/2013 | Sinclair ................ H04L 9/0891 |
| | | 713/161 |
| 2014/0098247 A1 | 4/2014 | Rao et al. |
| 2014/0278060 A1 * | 9/2014 | Kordari ................ G01C 21/206 |
| | | 701/422 |
| 2014/0280316 A1 * | 9/2014 | Ganick ............ G06F 17/30522 |
| | | 707/769 |
| 2014/0347492 A1 * | 11/2014 | Fales ..................... G01C 11/06 |
| | | 348/164 |
| 2015/0161440 A1 * | 6/2015 | Chao .................... G06K 9/6211 |
| | | 382/113 |
| 2015/0168174 A1 * | 6/2015 | Abramson ......... G01C 21/3697 |
| | | 701/408 |
| 2015/0316383 A1 * | 11/2015 | Donikian ............. G01C 21/165 |
| | | 701/408 |
| 2016/0025498 A1 * | 1/2016 | Le Grand ............. G01C 21/12 |
| | | 701/469 |
| 2016/0066151 A1 * | 3/2016 | Palanki .................. H04L 67/10 |
| | | 455/456.1 |
| 2016/0084658 A1 * | 3/2016 | Chao .................... G01C 21/206 |
| | | 701/533 |
| 2017/0074659 A1 * | 3/2017 | Giurgiu ................. G01S 19/41 |

* cited by examiner

SYSTEMS AND METHODS FOR PROVIDING ERROR CORRECTION AND MANAGEMENT IN A MOBILE-BASED CROWDSOURCING PLATFORM

CROSS REFERENCE TO RELATED APPLICATIONS

This application claims the benefit of U.S. Provisional Application No. 62/189,446, filed Jul. 7, 2015, and U.S. Provisional Application No. 62/189,448, filed Jul. 7, 2015, and U.S. Provisional Application No. 62/189,451, filed Jul. 7, 2015, the contents of each of which are incorporated by reference herein in their entireties.

FIELD OF THE INVENTION

The present disclosure relates generally to management systems and methods, and, more particularly, to a system for providing a mobile-based crowdsourcing platform configured to provide an intuitive and semi-automated means of collecting and managing user-driven data.

BACKGROUND

Geolocation (or localization) is a term that describes a broad range of technologies for deriving the spatial location (e.g., X, Y, Z Cartesian coordinates) of an object by processing transmitted signals that are received, emitted, or reflected by that object. For example, geolocation may include the identification of the real-world geographic location of an object, such as a radar source, mobile phone, or Internet-connected computer terminal. Geolocation may ultimately refer to the practice of assessing the location, or to the actual assessed location. Accordingly, the location of a person may be determined based, at least in part on, data received from a mobile device that the person is carrying or otherwise associated with.

A primary challenge for many geolocation systems is the ability to determine an indoor location of a user. For example, traditional location techniques, such as global positioning satellite (GPS) are shown to be unsuccessful in indoor environments because physical barriers degrade GPS signals. GPS relies on accurate distance estimation between the fixed station (GPS satellite) and mobile station (the receiver). This distance is obtained accurately if and only if the link between the two stations is not blocked by any other objects and line-of-sight (LOS) conditions exist between the transmitter and receiver. In indoor environments, however, the GPS signals are blocked by different objects, so they are attenuated to such an extent that they are either not detectable by the receiver or the distance estimation process yields highly inaccurate distance.

Some companies have relied on different methods for dealing with the issues caused by indoor environments by utilizing multiple signal sources, including GPS readings, magnetic field readings, received-signal-strength (RSS) techniques, radiofrequency (RF) signals, and other readings for determining the location of a user within an indoor environment. The current methods, however, suffer from drawbacks. For example, current methods as described above generally require the installation of hardware devices within, or in proximity to, the indoor environment. The hardware devices may include, for example, beacon-type devices configured to capture and record the multitude of signals so as to compensate for the indoor barriers. Furthermore, such methods also require the use of a known layout or floor plan in order to determine the indoor location of the user, wherein, without such known layouts, the systems will fail to function as intended.

SUMMARY

The present invention provides systems and methods for providing error correction and management in a mobile-based crowdsourcing platform. In particular, the system of the present invention includes a plurality of remote mobile devices configured to communicate and exchange data with a cloud-based service, such as a crowdsourcing platform. The system includes data correction management configured to recognize and recalibrate data errors during the collection and aggregation of the crowd-sourced data. The crowdsourcing platform generally provides a geolocation service based on the crowdsourcing, or polling, of users of the mobile devices so as to determine location and movement of the users within a specific environment. In the embodiments described herein, the environment is an indoor environment, such as an office space. However, it should be noted that the systems and methods of the present invention may be used in outdoor environments.

The location and movement of the users within the office space may be based on user data as captured by one or more sensors on the mobile device, wherein such data includes, but is not limited to, user movement (e.g., GPS measurements, IMU measurements, etc.) as well as signals from the mobile device (e.g., received signal strength (RSS) measurements, RF measurements, etc.). In some embodiments, direct user input may be received (e.g., users be prompted to verify their location or movement, as well as specific landmarks or objects within the vicinity) so as to improve the degree of certainty of a user's position within the office space.

The system is further configured to automatically map a floor plan or layout of a location based on the user data. For example, the system may include mapping/rendering software configured to identify patterns of user movement based on the user data, and, based on further confirmation from direct user input, render a floor plan of the office space in which the users are located and moving. The system is configured to continually update a floor plan based on polling of multiple users within the office space so as to further refine and improve accuracy of the generated floor plan.

The system is further configured to recognize and recalibrate data errors during the collection and aggregation of the crowd-sourced data. In particular, the system includes an error correction and management system configured to analyze rendered floor plans or layouts in light of user input data continually collected so as to determine any potential errors in data input. The data correction is based on the concept of, at certain points in time, recognizing any potential errors in data and re-calibrating collection or aggregation of crowd-sourced data so as to effectively "reset" such data collection or further refine the rendering of any given floor plan or layout, thereby cancelling out any errors that may have otherwise potentially cascaded into the data collection process. In addition to user input, the system may further utilize known floor plans or layouts for comparing with a rendered floor plan or layout for comparing and revising the rendered layout to improve accuracy.

The present invention provides numerous advantages over current geolocation systems and methods. In particular, the system does not require known layouts or floor plans for geolocation. Rather, the system is able to automatically render a layout or floor plan based on the identification of patterns of user movement and locations from user data collected by crowdsourcing techniques. Additionally, the system is able to confirm, from direct user input, particular landmarks or spaces so as assist in the rendering of the layout or floor plan. Furthermore, the use of crowdsourcing makes data more complete and up-to-date, as the system is configured to continually update a floor plan based on polling of multiple users within the space so as to further refine and improve accuracy of the generated layout or floor plan. The larger and more robust sets of data collected from crowdsourcing users further allows the deployment of self-learning algorithms, for example, which may result in improved accuracy in a rendered layout or floor plan. Furthermore, the configuration of the system of the present invention may reduce or even entirely eliminate the specific hardware requirements (e.g., beacon-like devices) that are required in current systems and methods.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
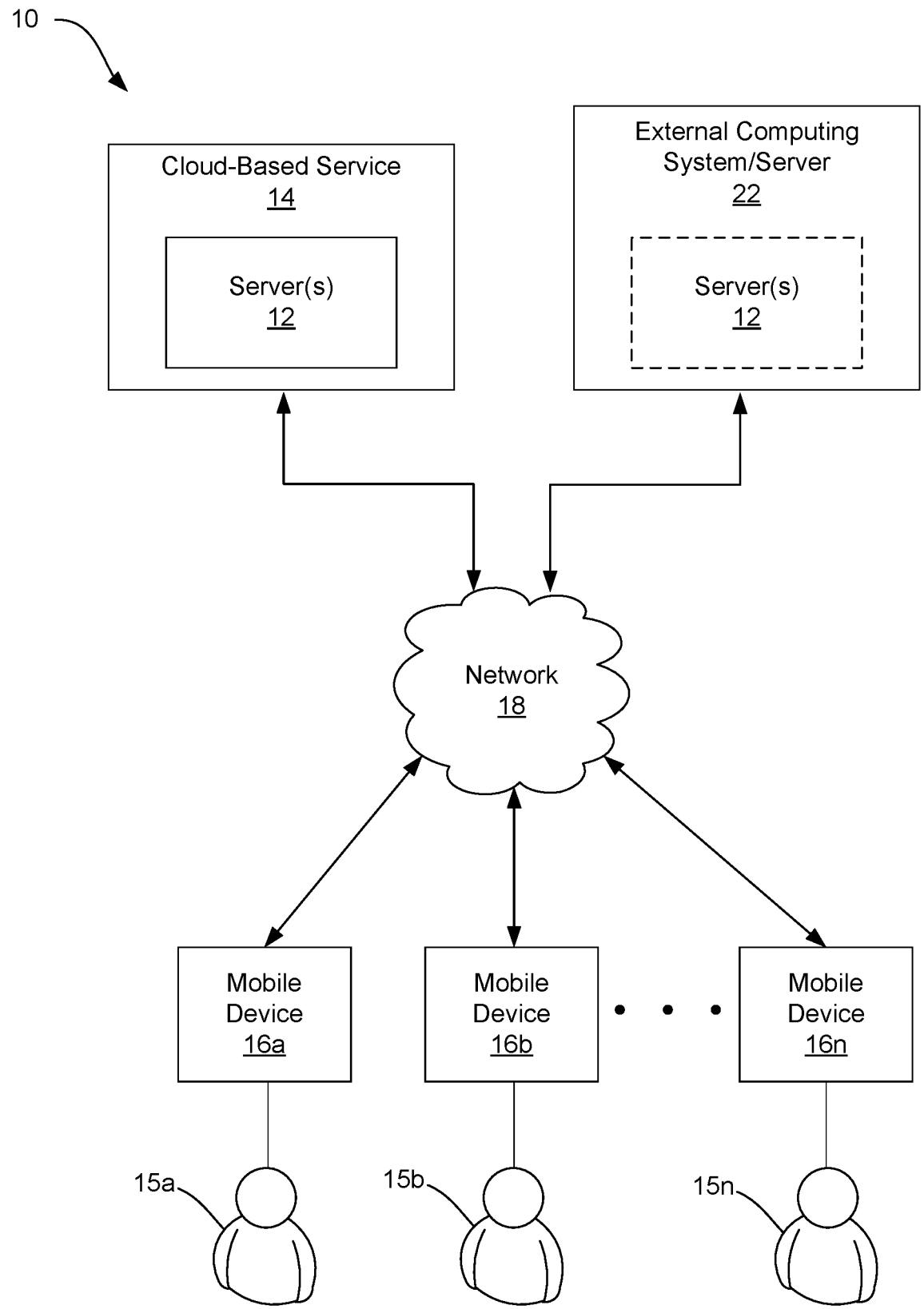
FIG. 1 is a block diagram illustrating one embodiment of an exemplary system for geolocation services in a mobile-based crowdsourcing platform.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides systems and methods for providing error correction and management in a mobile-based crowdsourcing platform. In particular, the system of the present invention includes a plurality of remote mobile devices configured to communicate and exchange data with a cloud-based service, such as a crowdsourcing platform. The system includes data correction management configured to recognize and recalibrate data errors during the collection and aggregation of the crowd-sourced data. The crowdsourcing platform generally provides a geolocation service based on the crowdsourcing, or polling, of users of the mobile devices so as to determine location and movement of the users within a specific environment. In the embodiments described herein, the environment is an indoor environment, such as an office space. However, it should be noted that the systems and methods of the present invention may be used in outdoor environments.

The location and movement of the users within the office space may be based on user data as captured by one or more sensors on the mobile device, wherein such data includes, but is not limited to, user movement (e.g., GPS measurements, IMU measurements, etc.) as well as signals from the mobile device (e.g., received signal strength (RSS) measurements, RF measurements, etc.). In some embodiments, direct user input may be received (e.g., users be prompted to verify their location or movement, as well as specific landmarks or objects within the vicinity) so as to improve the degree of certainty of a user's position within the office space.

The system is further configured to automatically map a floor plan or layout of a location based on the user data. For example, the system may include mapping/rendering software configured to identify patterns of user movement based on the user data, and, based on further confirmation from direct user input, render a floor plan of the office space in which the users are located and moving. The system is configured to continually update a floor plan based on polling of multiple users within the office space so as to further refine and improve accuracy of the generated floor plan.

The system is further configured to recognize and recalibrate data errors during the collection and aggregation of the crowd-sourced data. In particular, the system includes an error correction and management system configured to analyze rendered floor plans or layouts in light of user input data continually collected so as to determine any potential errors in data input. The data correction is based on the concept of, at certain points in time, recognizing any potential errors in data and re-calibrating collection or aggregation of crowd-sourced data so as to effectively "reset" such data collection or further refine the rendering of any given floor plan or layout, thereby cancelling out any errors that may have otherwise potentially cascaded into the data collection process.

The present invention provides numerous advantages over current geolocation systems and methods. In particular, the system does not require known layouts or floor plans for geolocation. Rather, the system is able to automatically render a layout or floor plan based on the identification of patterns of user movement and locations from user data collected by crowdsourcing techniques. Additionally, the system is able to confirm, from direct user input, particular landmarks or spaces so as assist in the rendering of the layout or floor plan. Furthermore, the use of crowdsourcing makes data more complete and up-to-date, as the system is configured to continually update a floor plan based on polling of multiple users within the space so as to further refine and improve accuracy of the generated layout or floor plan. The larger and more robust sets of data collected from crowdsourcing users further allows the deployment of self-learning algorithms, for example, which may result in improved accuracy in a rendered layout or floor plan. Furthermore, the configuration of the system of the present invention may reduce or even entirely eliminate the specific hardware requirements (e.g., beacon-like devices) that are required in current systems and methods.

FIG. 1 illustrates one embodiment of an exemplary system 10 consistent with the present disclosure. As shown, the system 10 includes a server 12 embodied on an internet-based computing system/service. For example, as shown, the server 12 may be embodied on a cloud-based service 14, for example. The server 12 is configured to communicate and share data with one or more users 15(1)-15(n) via user mobile devices 16(a)-16(n) over a network 18. In the present context, the users 15(1)-15(n) may include administrators, customers, or clients of a service provided to one or more remote users via the server 12. The users 15(1)-15(n) may also include particular persons to which the service is directed.

For example, the server 12 may host a crowdsourcing platform for receiving user-driven data related to a particular environment in which users may be located, or otherwise reside, wherein such data may be useful to an owner of the space or for conveying useful information to users within the space. In the embodiments described herein, the server 12 hosts a crowdsourcing platform for providing a geolocation service. The server 12 is configured to receive user-driven data for use in the automatic mapping of a layout or floor plan of an environment in which the users are located and moving within. In examples described in greater detail, the environment may include an indoor environment within a building or other structure, such that floor plans of the building may be generated based on user data. It should be noted that the system consistent with the present disclosure may be used for the mapping and generation of a layout of an outdoor environment and is not limited to geolocation services for an indoor environment.

Yet still, the geolocation service of the present invention may further be useful in building maintenance, wherein the server is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space. Accordingly, the system of the present invention may be useful with the crowdsourcing platform as described in co-pending and co-owned U.S. patent application Ser. No. 14/328,492, filed Jul. 10, 2014, the contents of which are incorporated herein by reference in their entirety.

The system 10 may further include an external computing system/server 22 configured to communicate with at least the cloud-based service 14, and subsequently the server 12, via the network 18. The external computing system/server 20 may be embodied as a remote server, for example, for communicating with the server 12 and for performing the other functions described herein. Similarly, in some embodiments, the server 12 may be embodied on the external computing system/server 22. In the embodiments described herein, the external computing system/server 20 may be embodied as a remote server having one or more databases associated with the server 12, as will be described in greater detail herein.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 16, between the mobile devices 16 and the cloud-based service 14 and/or the external computing device/system/server 22, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of June 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

As shown, in an aspect of the present invention, data and other information and services are, for example, input by one or more users 15 (shown as users 15a-15n) and received by one or more associated mobile devices 16 (shown as mobile devices 16a-16n). The mobile devices 16 are configured to be communicatively coupled to the cloud-based service 14 and/or external device, system or server 22 via the network 18. In addition, or alternatively, the mobile devices 16 are configured to be communicatively coupled to one another via the network 18. In some embodiments, user data may be passively transmitted to the server 12 (e.g., data captured by one or more sensors on the mobile device 16 may be automatically transmitted to the server 12).

The server 12 is configured to communicate and share data with the mobile devices 16 associated with one or more users 15. Accordingly, the mobile device 16 may be embodied as any type of device for communicating with the server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. In the embodiments described here, the mobile device 16 is generally embodied as a smartphone having one or more sensors for capturing various data related to at least one of user movement, user location, signals outputted from or received by the mobile device 16, and the like.

It should be noted that, although the following description refers to the mobile device 16 as being a smartphone, the mobile device 16 may be embodied as a "smart" appliance or system. A "smart" appliance or system or may include, for example, any appliance or system having wireless (or wired) capability to communicate and exchange data with the server 12 in a manner described herein. For example, rather than receiving user-driven data from a user via their smartphone, the server 12 may receive data from other systems in a building or space, such as lighting system, for example, networked or otherwise connected to the server 12 so as to provide information related to occupancy (e.g., lights on versus lights off) in any given room of a space. Accordingly, in addition, or alternatively, to user-driven data received from smartphones, or other mobile devices, the server 12 may receive data from other connected systems, which can essentially assist in, not only the rendering of floor plans, but also the mapping of traffic patterns within a space.

Figure 2:
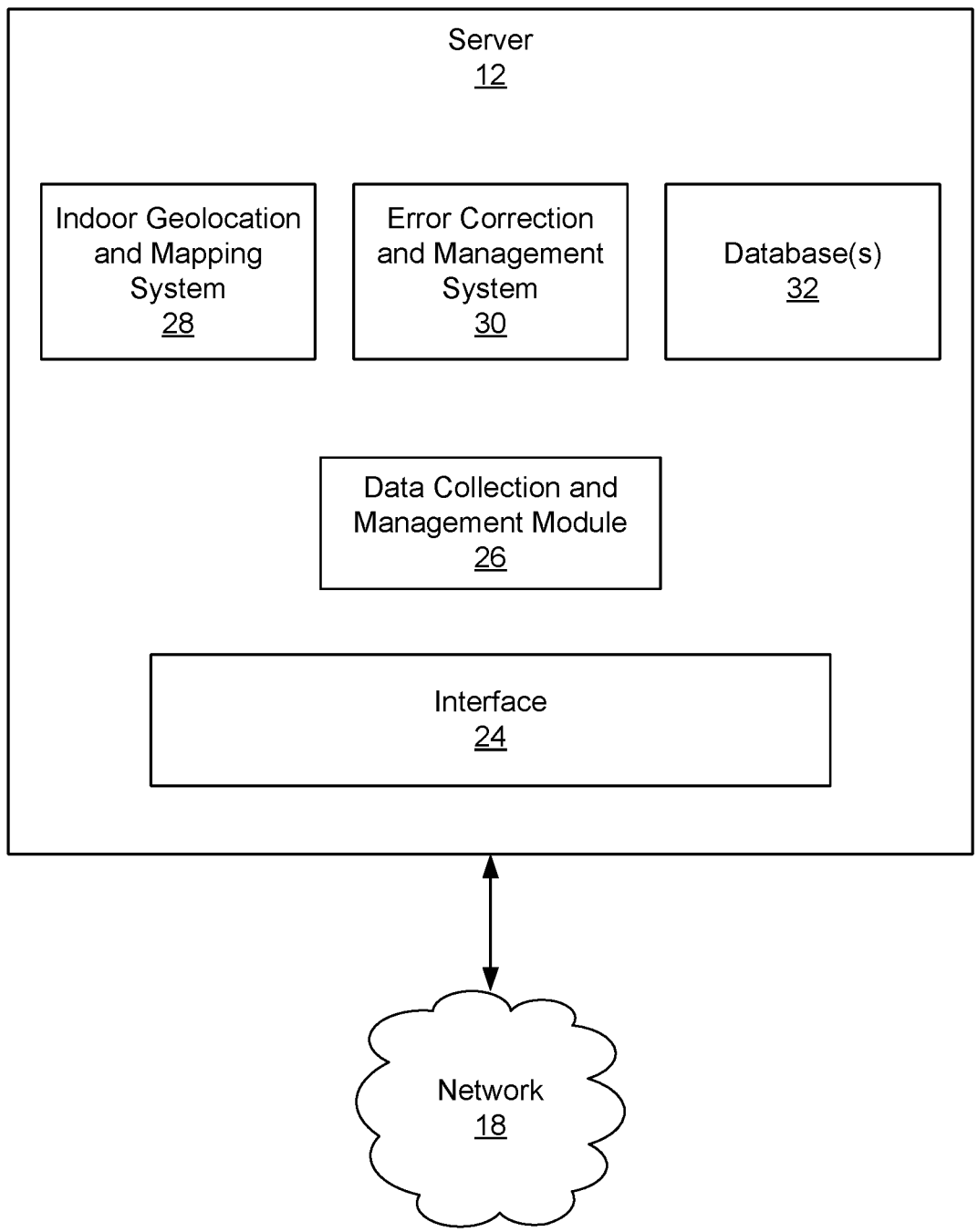
FIG. 2 is a block diagram illustrating the server of FIG. 1 in greater detail.

FIG. 2 is a block diagram illustrating the server 12 in greater detail. As shown, the server 12 may include an interface 24, a data collection and management module 26, an indoor geolocation and mapping system 28, an error correction and management system 30, and one or more databases 32 for data related data received from the mobile devices 16. For example, the data collection and management module 26 may be configured to communicate and exchange data with at least the indoor geolocation and mapping system 28, error correction and management system 30, and one or more databases 32, each of which is described in greater detail herein.

The interface 24 may generally allow a user (e.g., an authorized user 15) to access data on the server 12. For example, upon accessing the server 12 on the cloud-based service 14, the interface 24 may be presented to the user via their device 16, in which the user may navigate a dashboard or standard platform interface so as to access data (stored in the databases 32) collected from other users and their associated mobile devices. For example, in the event that the service provided is the crowdsourcing platform for geolocation services, certain users may access the data collected from users within the environment being mapped, as well as the specific floor plans or layouts rendered based on the user data.

Figure 3:
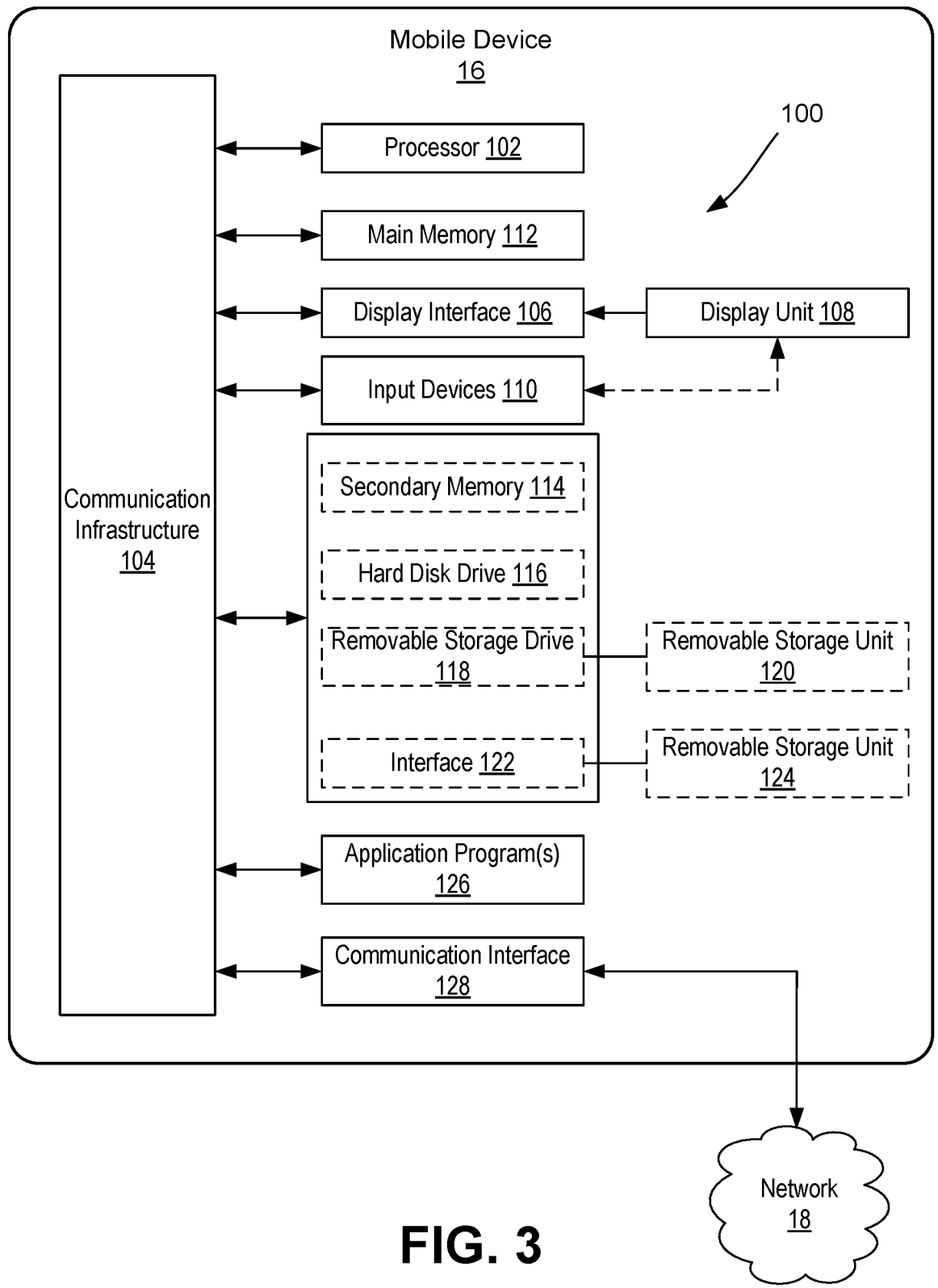
FIG. 3 is a block diagram illustrating at least one embodiment of a mobile device for providing user data related to user location and/or movement consistent with the present disclosure.

FIG. 3 is a block diagram illustrating at least one embodiment of a mobile device 16 for providing user data related to user location and/or movement consistent with the present disclosure. The mobile device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including an app for providing direct user input with the geolocation service offered by a crowdsourcing platform.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effect such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radiofrequency identification (RFID) communication, cellular network communication, the most recently published versions of IEEE 802.11 transmission protocol standards as of June 2015, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 4:
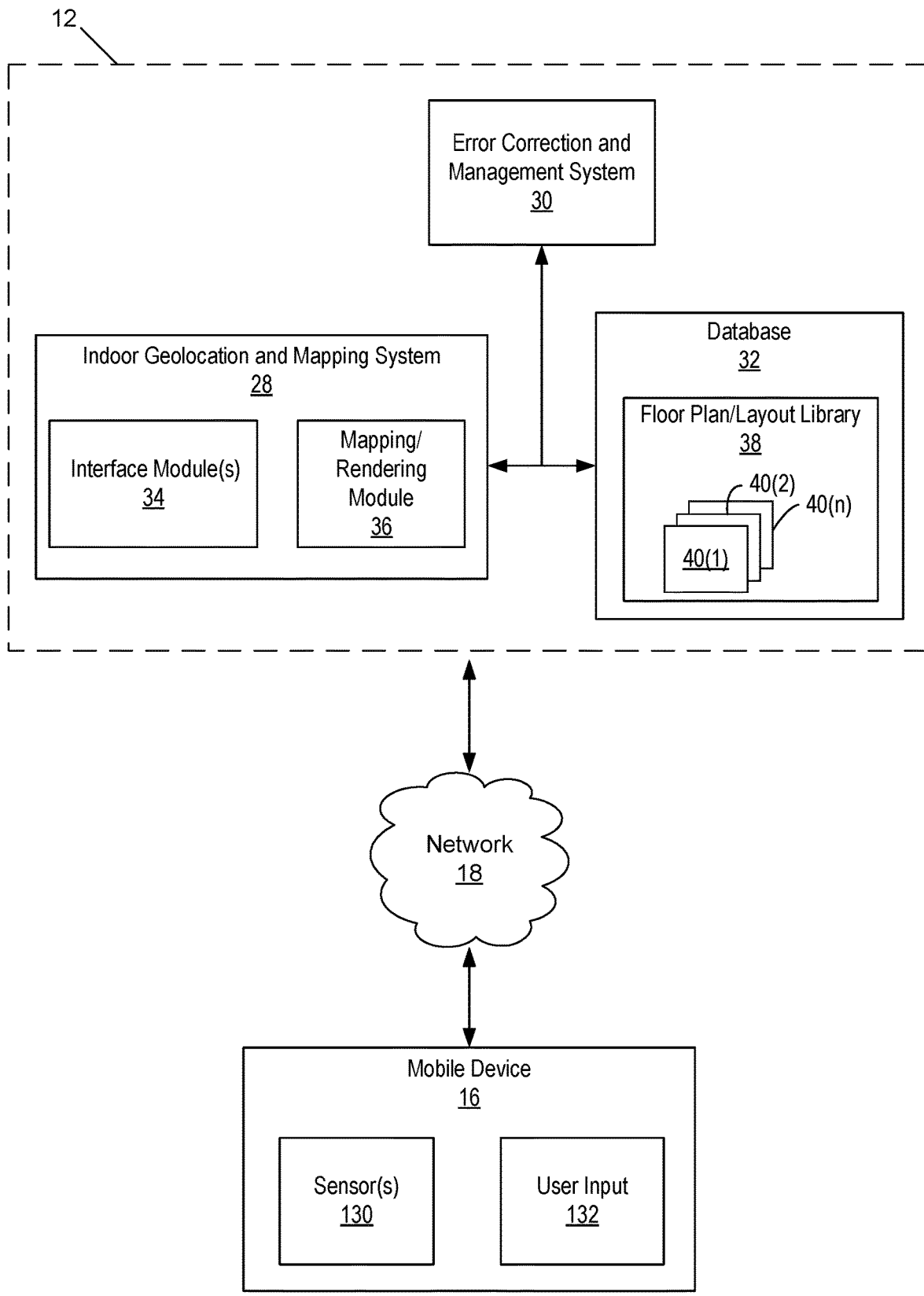
FIG. 4 is a block diagram illustrating the geolocation and mapping system and error correction and management system provided by a server consistent with the present disclosure in greater detail.

FIG. 4 is a block diagram illustrating the geolocation and mapping system 28 in greater detail. As shown, the geolocation and mapping system 28 may include one or more interface modules 34 and a mapping/rendering module 36. As will be described in greater detail herein, the geolocation and mapping system (by way of modules 34 and 36) is configured to receive the user data from the mobile device 16 related to user location and/or movement within an environment and further render a floor plan or layout based on the user data. Accordingly, the geolocation and mapping system 28 is configured to communicate with a floor plan/layout library 38 storing one or more floor plan/layout profiles 40(1)-40(n). In the event that an environment is being mapped for the first time, a new profile 40 is created. However, due to the nature of crowdsourcing, in which users may be continually polled at regular intervals, the geolocation and mapping system 28 may gain access to an existing profile 40 and update an existing floor plan or layout based on additional user data so as to further refine and improve accuracy of the generated floor plan or layout.

The one or more interface modules 34 are generally configured to receive sensor data captured by one or more sensors 130 of the mobile device 16. Upon analyzing the sensor data, the one or more interface modules 34 are configured to generate and transfer user position/movement data to the mapping/rendering module 36. The mapping/rendering module 36 is configured to process the user position/movement data and generate, or render, a floor plan or layout, as will be described in greater detail herein.

The error correction and management system 30 is configured to recognize and recalibrate data errors during the collection and aggregation of the crowd-sourced sensor data. In particular, the system 30 is configured to receive user input 132 directly from a user of the mobile device 16 and analyze rendered floor plans or layouts in light of user input data so as to determine any potential errors in data input. The correction is based on the concept of, at certain points in time, recognizing any potential errors in data and re-calibrating collection or aggregation of crowdsourced data so as to effectively "reset" such data collection or further refine the rendering of any given floor plan or layout, thereby cancelling out any errors that may have otherwise potentially cascaded into the data collection process.

Figure 5:
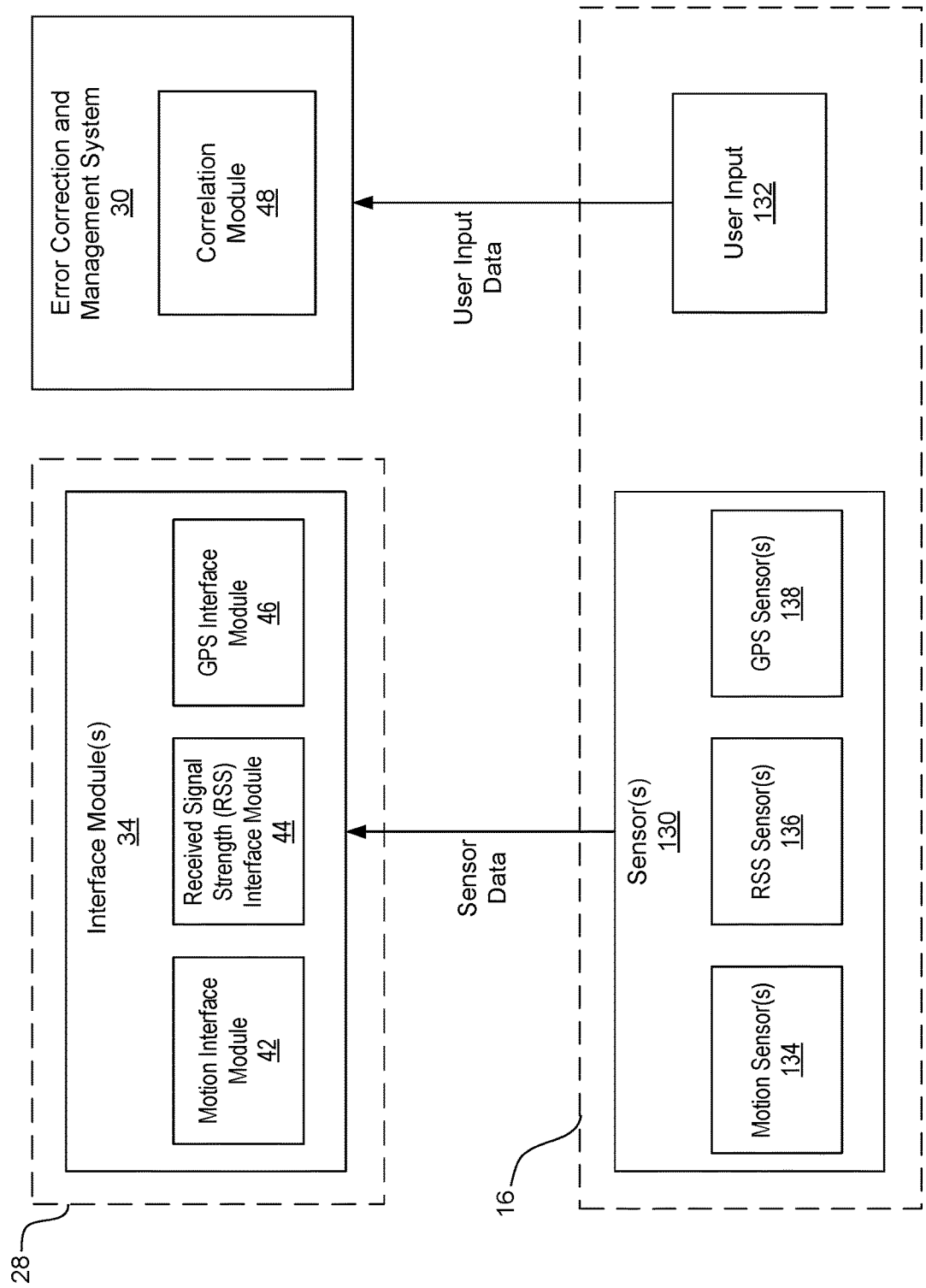
FIG. 5 is a block diagram illustrating collection of user data from one or more sensors of a mobile device and subsequent analysis of such data by interface modules of the indoor geolocation and mapping system.

FIG. 5 is a block diagram illustrating collection of sensor data captured by one or more sensors 130 of the mobile device 16 and subsequent analysis of such data by interface modules 32 of the indoor geolocation and mapping system 28. FIG. 5 further illustrates collection of user input data by the error correction and management system 30 directly from user input 132 of a mobile device 16. As shown, the mobile device 16 may include a variety of different sensors configured to capture data related to motion or position of the mobile device 16 and/or signals either transmitted from or to the mobile device 16. The sensors 130 may further be configured to capture user input, such as touch input and the like. As shown, the sensors 130 may include one or more motion sensors 134, a received signal strength (RSS) sensor 136, and a GPS sensor 138.

It should be noted that FIG. 5 illustrates one embodiment of set of sensors included in a mobile device consistent with the present disclosure and by no means is meant to limit the kind and/or amount of sensors for use in a system and/or method consistent with the present disclosure. For example, a system and method consistent with the present disclosure may include more or less sensors than what is illustrated in FIG. 5.

The one or more motion sensors 134 may be embodied as any type of sensor configured to capture motion data and produce sensory signals from which the geolocation and mapping system 28 may determine the user position and/or movement with the mobile device 16. In particular, the motion sensor 134 may be configured to capture data corresponding to the movement of the user device 16 or lack thereof. The motion sensor 134 may include, for example, an accelerometer, an altimeter, one or more gyroscopes, or other motion or movement sensor to produce sensory signals corresponding to motion or movement of the device 16 and/or a magnetometer to produce sensory signals from which direction of travel or orientation can be determined. The one or more motion sensors 134 may further include, or be coupled to, an inertial measurement unit (IMU) for example.

The motion sensors 134 may also be embodied as a combination of sensors, each of which is configured to capture a specific characteristic of the motion of the device 16, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

The RSS sensor 136 is generally configured to capture signal strength of the mobile device 16, which may be used to determine the distance between stations, as signal strength is usually related to the distance via a path-loss model which predicts the received signal strength at any specific distance based on the transmit power, signal attenuation gradient (known as path-loss exponent), number of attenuators and their respective attenuation level, and the distance to the stations. The GPS sensor 138 is configured to capture location data (e.g. coordinates) of the mobile device 16. In some embodiments, a system clock may be used and configured to determine date and time of day of the user device 16, wherein such data may be transmitted to the geolocation and mapping system 28.

As shown, the geolocation and mapping system 28 includes interface modules 34 configured to process and analyze data captured from corresponding sensors 132 to determine user position or movement based on analysis of the captured data. In the illustrated embodiment, the geolocation and mapping system 28 includes a motion interface module 42 configured to receive and analyze data captured by the one or more motions sensors 134, a RSS interface module 44 configured to receive and analyze data captured by the RSS sensor 136, and a GPS interface module 46 configured to receive and analyze data captured by the GPS sensor 138.

The motion interface module 42 is configured to receive motion data captured by the one or more motion sensors 134. Upon receiving the motion data from the one or more motion sensors 134, the motion interface module 42 may be configured to identify movement of the device 16 such as, for example, the direction of movement, location of the device 16 within a particular plot, magnitude of movement of the device 16, which may indicate user location/movement when combined with analyzing of RSS data and GPS data by the RSS and GPS interface modules 44, 46. The motion interface module 42 may include custom, proprietary, known and/or after-developed motion detection code (or instruction sets) that are generally well-defined and operable to identify a motion event.

The error correction and management system 30 is configured to receive data based on direct user input 132. For example, via the geolocation service provided by the crowdsourcing platform, a user may be prompted on their device 16 (via interactive user interface) to confirm or otherwise provide their location or movement within a space and/or their vicinity to specific landmarks or objects. By collecting direct user input data, the system is configured to automatically detect any potential errors or discrepancies in the input of sensor data and further correct such errors and inaccuracies in the system. The error correction and management system 30 may include a correlation module 48 configured to receive the user input data and further correlate the user input data with the sensor data, position/movement data generated by the interface modules 34, and/or the rendered floor plans or layouts. The correlation module 48 may include custom, proprietary, known and/or after-developed statistical analysis code (or instruction sets), hardware, and/or firmware that are generally well-defined and operable to receive two or more sets of data and identify, at least to a certain extent, a level of correlation and thereby associate the sets of data with one another based on the level of correlation. Based on the correlation, the error correction and management system 30 may be configured to detect potential discrepancies between the user input data and the other sets of data. For example, in the event that a level of correlation between sets of data falls below a certain threshold, it may be determined that an error is present. Upon identifying an error, the system may rely on the user input data to correct such error so as to improve the degree of certainty of a user's position or movement within a space and improve the accuracy of the rendered floor plan or layout.

Figure 6:
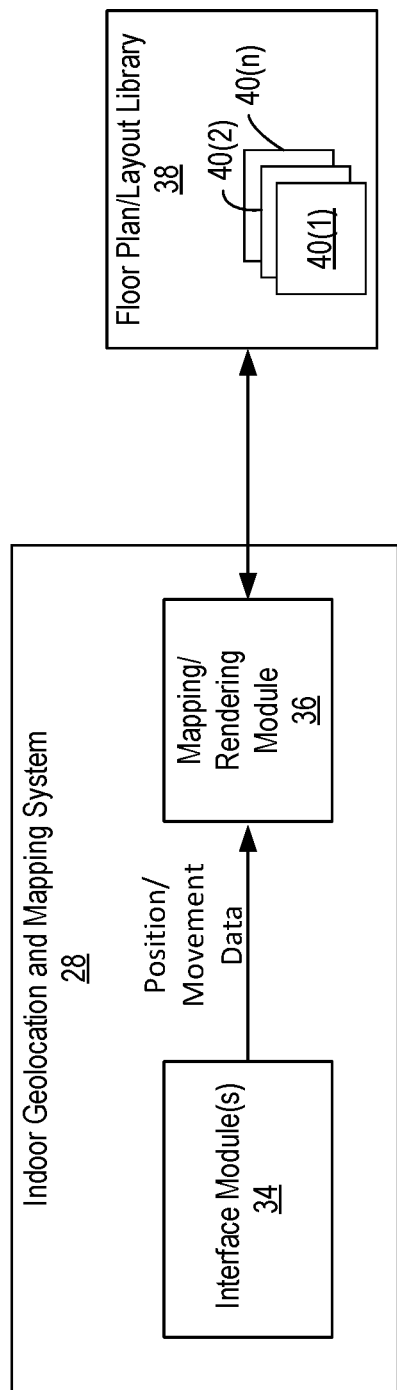
FIG. 6 is a block diagram illustrating communication between the geolocation and mapping system, the floor plan/layout library, and the mobile device.

FIG. 6 is a block diagram illustrating communication between the indoor geolocation and mapping system 28, floor plan/layout library 38, and the mobile device 16. Upon analyzing the sensor data, the one or more interface modules 34 are configured to generate and transfer user position/movement data to the mapping/rendering module 36 for subsequent rendering of a floor plan or layout to be saved in a profile 40 of the library 38. In particular, the mapping/rendering module 36 may include custom, proprietary, known and/or after-developed data and graphics code (or instruction sets, functions, etc.) that are generally well-defined and operable to receive the position/movement data from the interface modules 34 and generate a visual model of a floor plan or layout of the space in which a user is located. The mapping/rendering module 36 may further be configured to identify patterns of user movement based on the position/movement data, and, based on further confirmation from direct user input, render a floor plan or layout.

Figure 7:
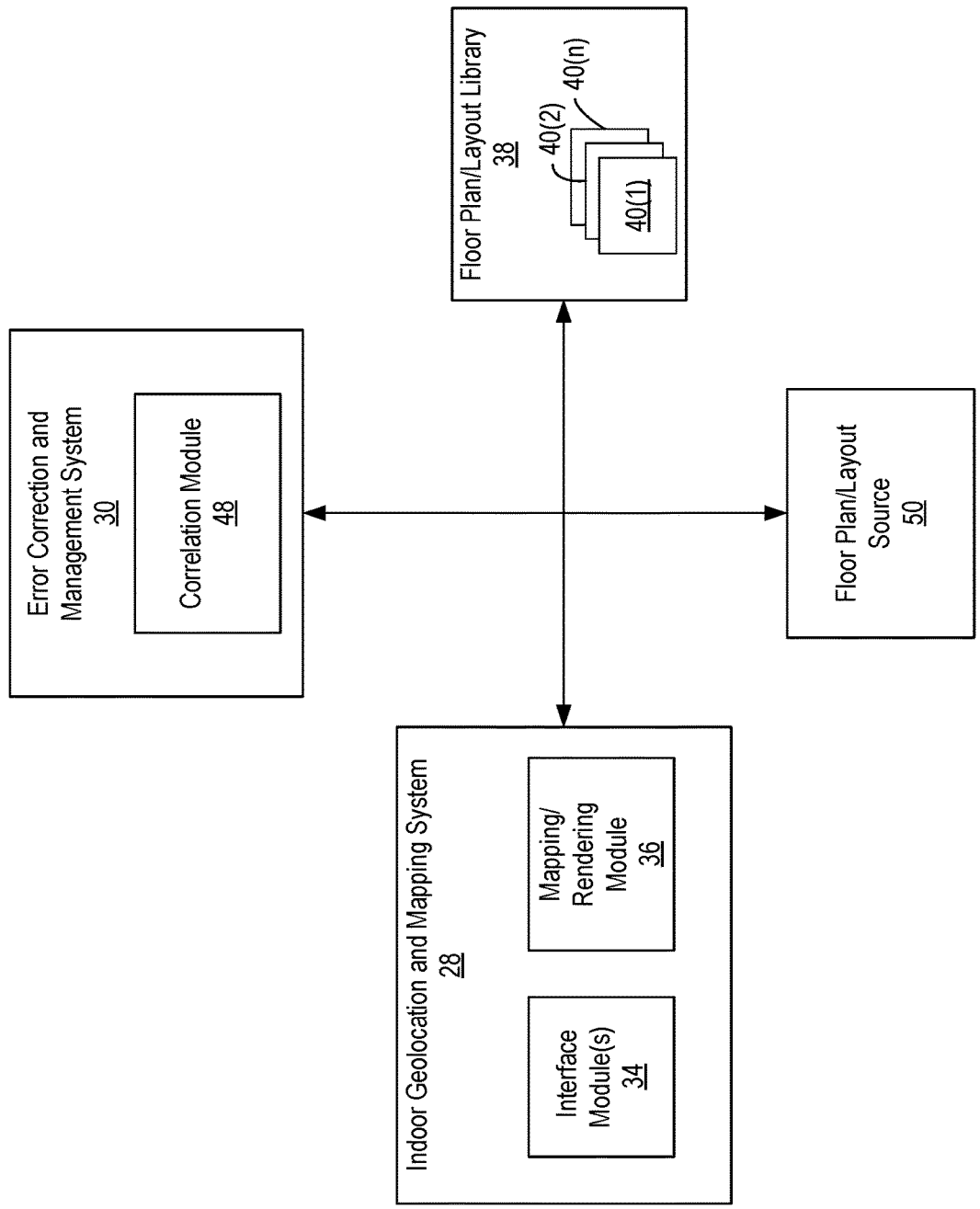
FIG. 7 is a block diagram illustrating communication between the geolocation and mapping system, the error correction and management system, the floor plan/layout library, and a floor plan/layout source.

FIG. 7 is a block diagram illustrating communication between the geolocation and mapping system 28, the error correction and management system 30, the floor plan/layout library 38, and a floor plan/layout source 50. As previously described, the error correction and management system 30 is configured to receive data based on direct user input 132 and use the user input data to detect any potential errors or discrepancies in the input of sensor data and further correct such errors and inaccuracies in the system. More specifically, the correlation module 48 configured to receive the user input data and further correlate the user input data with the sensor data, position/movement data generated by the interface modules 34, and/or the rendered floor plans or layouts. Based on the correlation, the error correction and management system 30 may be configured to detect potential discrepancies between the user input data and the other sets of data. For example, in the event that a level of correlation between sets of data falls below a certain threshold, it may be determined that an error is present. Upon identifying an error, the system may rely on the user input data to correct such error so as to improve the degree of certainty of a user's position or movement within a space and improve the accuracy of the rendered floor plan or layout.

The mapping/rendering module 36 is configured to continually update a floor plan or layout based on the user input data collected by polling of multiple users within the space so as to further refine and improve accuracy of the generated floor plan or layout. In addition to user input data, the system may further utilize known floor plans or layouts from a source 50 for comparing with a rendered floor plan or layout and revising the rendered layout to improve accuracy.

The present invention provides numerous advantages over current geolocation systems and methods. In particular, the system does not require known layouts or floor plans for geolocation. Rather, the system is able to automatically render a layout or floor plan based on the identification of patterns of user movement and locations from user data collected by crowdsourcing techniques. Additionally, the system is able to confirm, from direct user input, particular landmarks or spaces so as assist in the rendering of the layout or floor plan. Furthermore, the use of crowdsourcing makes data more complete and up-to-date, as the system is configured to continually update a floor plan based on polling of multiple users within the space so as to further refine and improve accuracy of the generated layout or floor plan. The larger and more robust sets of data collected from crowdsourcing users further allows the deployment of self-learning algorithms, for example, which may result in improved accuracy in a rendered layout or floor plan. Furthermore, the configuration of the system of the present invention may reduce or even entirely eliminate the specific hardware requirements (e.g., beacon-like devices) that are required in current systems and methods.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for providing error correction and management in a mobile-based crowdsourcing platform, the system comprising:
   a mobile device for user input and interaction; and
   a server configured to communicate with and exchange data with the mobile device, the server comprising a processor coupled to a memory containing instructions executable by the processor to cause the server to:
   receive passive user data from the mobile device, the passive user data is associated with at least one of a location of the user and movement of the user within an environment over a period of time, the passive user data is captured by, and transmitted from, one or more sensors of the mobile device;
   generate a layout of the environment based, at least in part, on the passive user data, the layout comprising layout data;
   prompt a user of the mobile device for direct user input with a user interface (UI) provided on the mobile device, the direct user input comprising active user verification and confirmation of at least one of the user's location, user's movement, and specific landmarks or objects within the user's vicinity within the environment;
   receive direct user input data from the mobile device;
   automatically correlate the direct user input data with the passive user data and layout data based, at least in part, on a statistical analysis algorithm;
   identify any discrepancies between the direct user input data and the passive user data and layout data based on a determination of whether a level of correlation between the direct user input and passive user data and layout data falls below a threshold level;
   revise the layout of the environment based on identified discrepancies; and
   continually update and refine the layout of the environment based on subsequent passive and direct user data received from the mobile device or from one or more other mobile devices associated with separate and different users within the given environment.

2. The system of claim 1, wherein the mobile device is selected from the group consisting of a tablet computer, a laptop computer, a notebook computer, a mobile computing device, a smart phone, and a cellular telephone.

3. The system of claim 1, wherein the server and the mobile device are configured to wirelessly communicate and exchange data with one another over a network.

4. The system of claim 3, wherein the network is selected from the group consisting of Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, and Near Field Communication (NFC).

5. The system of claim 1, wherein the communication and exchange of data between the server and the mobile device is provided via a cloud-based service.

6. The system of claim 1, wherein the one or more sensors are configured to capture data related to at least one of motion or position of the mobile device, signals transmitted from or to the mobile device, and direct user input with the mobile device.

7. The system of claim 6, wherein the one or more sensors are selected from the group consisting of a motion sensor, a received signal strength (RSS) sensor, and a global positioning satellite (GPS) sensor.

8. The system of claim 7, wherein the motion sensor is selected from the group consisting of an accelerometer, an altimeter, one or more gyroscopes, other motion or movement sensor to produce sensory signals corresponding to motion or movement of the mobile device, and a magnetometer to produce sensory signals from which direction of travel or orientation can be determined.

9. The system of claim 8, wherein the motion sensor is coupled to an inertial measurement unit (IMU).

10. The system of claim 9, wherein passive user data comprises at least one of GPS measurements and IMU measurements.

11. The system of claim 7, wherein user data comprises RSS measurements.

12. The system of claim 1, wherein the rendered layout of the environment comprises a floorplan of an office space.

13. The system of claim 12, wherein the location is an office space.

14. A method for providing error correction and management in a mobile-based crowdsourcing platform, the method comprising:
  receiving passive user data from a plurality of mobile devices, wherein the passive user data is associated with at least one of a location and movement of a user associated with one of the plurality of mobile devices within an environment over a period of time, the passive user data is captured by, and transmitted from, one or more sensors of the mobile device;
  storing the user data in a database;
  generating a graphical layout of the environment based, at least in part, on the passive user data, the layout comprising layout data;
  prompting the user of the mobile device for direct user input with a user interface (UI) provided on the mobile device, the direct user input comprising active user verification and confirmation of at least one of the user's location, user's movement, and specific landmarks or objects within the user's vicinity within the environment;
  receiving direct user input data from the mobile device;
  automatically correlate the direct user input data with the passive user data and layout data based, at least in part, on a statistical analysis algorithm;
  identifying any discrepancies between the direct user input data and the passive user data and layout data based on a determination of whether a level of correlation between the direct user input and passive user data and layout data falls below a threshold level;
  revising the layout of the environment based on identified discrepancies; and
  continually update and refine the layout of the environment based on subsequent passive and direct user data received from the mobile device or from one or more other mobile devices associated with separate and different users within the given environment.

* * * * *